United States Patent [19]

Sasou et al.

[11] Patent Number: 5,463,208
[45] Date of Patent: Oct. 31, 1995

[54] TASK PROCESSING APPARATUS

[75] Inventors: Hiroshi Sasou; Tomoki Kaya; Tosiaki Watanabe; Shinji Fukaya, all of Tokyo, Japan

[73] Assignee: Tamura Electric Works, Ltd., Tokyo, Japan

[21] Appl. No.: 210,324

[22] Filed: Mar. 18, 1994

[30] Foreign Application Priority Data

Mar. 19, 1993 [JP] Japan .................................. 5-083828

[51] Int. Cl.⁶ .......................... G06F 15/46; G06K 17/00
[52] U.S. Cl. ......................... 235/380; 235/473; 364/132; 364/138
[58] Field of Search ................................... 235/437, 380; 364/132, 138

[56] References Cited

U.S. PATENT DOCUMENTS

| | | | |
|---|---|---|---|
| 4,754,427 | 6/1988 | Okayama | 364/132 |
| 4,825,054 | 4/1989 | Rust et al. | 235/380 |
| 4,827,425 | 5/1989 | Linden | 235/380 |
| 4,851,651 | 7/1989 | Gaucher | 235/380 |
| 4,992,950 | 2/1991 | Francisco | 364/478 |
| 5,095,417 | 3/1992 | Hagiwara et al. | 364/138 |
| 5,266,781 | 11/1993 | Warwick et al. | 235/380 |

*Primary Examiner*—John Shepperd
*Attorney, Agent, or Firm*—Blakely, Sokoloff, Taylor & Zafman

[57] ABSTRACT

A task processing apparatus includes a main CPU, a plurality of sub-CPUs, a first starting section, a second starting section, and a notification section. The plurality of sub-CPUs independently execute a series of difference tasks set in advance in accordance with a predetermined sequence. The first starting section is arranged in the main CPU to output a first starting signal for starting the first sub-CPU, of the plurality of sub-CPUs, which executes a first task at the start of the series of tasks. The second starting section is arranged in each of the sub-CPUs except for the last sub-CPU. When the task in a given sub-CPU is completed, the second starting section outputs a second starting signal for starting the next sub-CPU which executes the next task. The notification section is arranged in the last sub-CPU of the plurality of sub-CPUs. The notification section supplies a processing completion signal indicating completion of the series of tasks to the main CPU when the last task is completed.

7 Claims, 3 Drawing Sheets

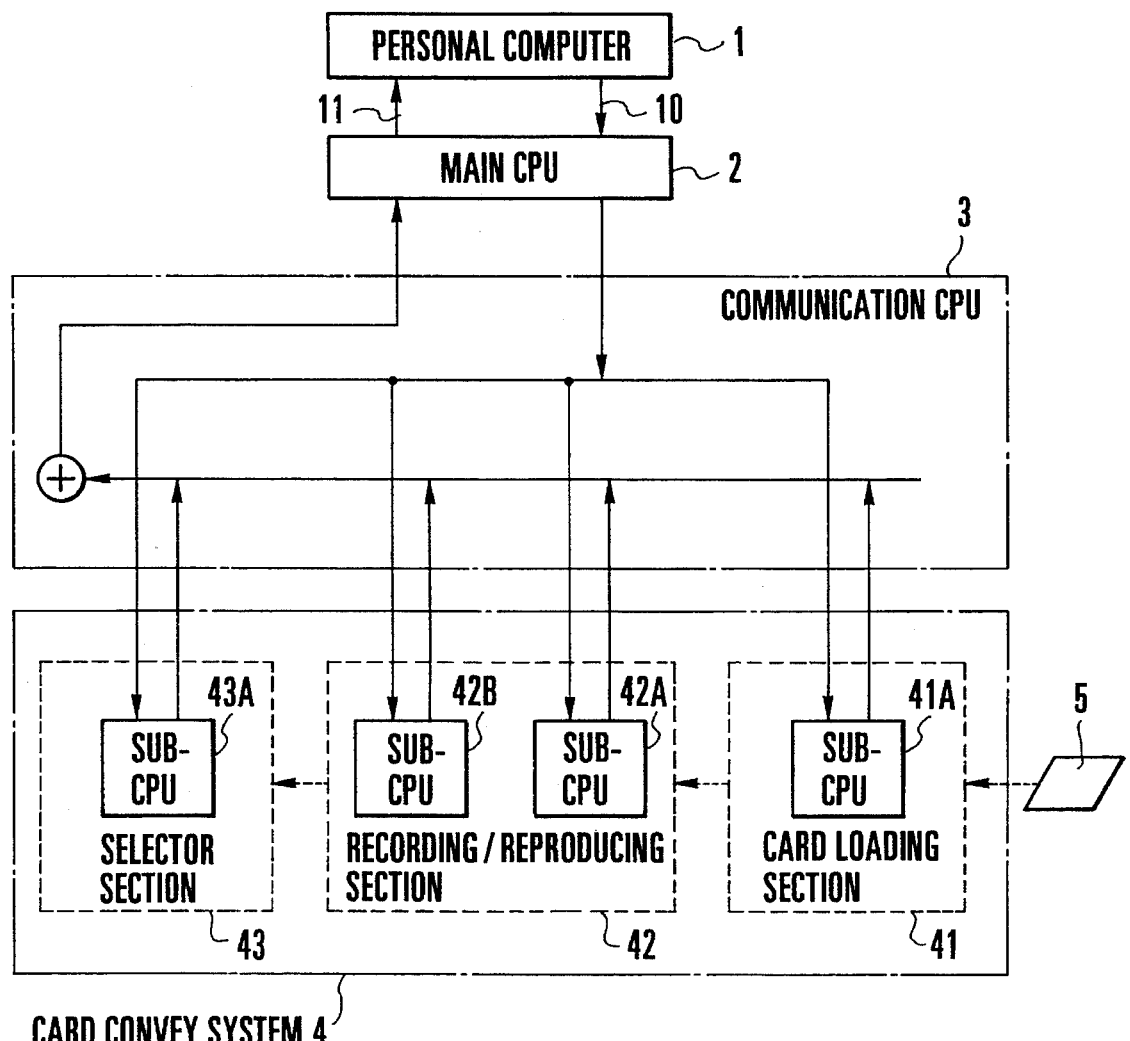

TASK PROCESSING APPARATUS

BACKGROUND OF THE INVENTION

The present invention relates to a task processing apparatus in a multi-CPU system constituted by a plurality of CPUs designed to respectively execute different tasks.

As a conventional task processing apparatus of this type, a card encoder like the one shown in FIG. 4 is available. This card encoder is constituted by a personal computer 1, a main CPU 2, a communication CPU 3, and a card convey system 4. The card encoder serves to record value information on a magnetic card 5. The card convey system 4 for actually conveying the card 5, recording value information thereon, and issuing the card having the value information recorded thereon is constituted by a card loading section 41, a recording/reproducing section 42, and a selector section 43. A sub-CPU 41A, a pair of sub-CPUs 42A and 42B, and a sub-CPU 43A are respectively arranged for these sections.

When an operator performs a card issue operation by using the personal computer 1, a card issue command signal 10 is sent from the personal computer 1 to the main CPU 2. Upon reception of the card issue command signal 10, the main CPU 2 gives a load command to the sub-CPU 41A of the card loading section 41 via the communication CPU 3 to load the card 5 on which no information is recorded. As a result, one card 5 is loaded by the card loading section 41, and the sub-CPU 41A determines that information can be recorded on the card 5. Information indicating this determination is transmitted to the main CPU 2 via the communication CPU 3. The main CPU 2 then supplies a record command to the sub-CPU 42A of the recording/reproducing section 42 via the communication CPU 3 to record value information on the card 5. Upon reception of information indicating the completion of recording from the sub-CPU 42A which has recorded the value information on the card 5, the main CPU 2 supplies reproduction and check commands to the sub-CPU 42B of the recording/reproducing section 42 via the communication CPU 3 to reproduce and check the information recorded on the card 5.

Upon reception of a check result from the sub-CPU 42B via the communication CPU 3, which result is obtained by checking the recorded/reproduced information in accordance with these commands, the main CPU 2 transmits defect/non-defect information of the card 5 corresponding to the check result to the sub-CPU 43A of the selector section 43 via the communication CPU 3, thus causing the sub-CPU 43A to select a card on which value information is properly recorded. Upon completion of selection of the card 5, the sub-CPU 43A transmits a response signal 11 corresponding to the card issue command signal 10 to the personal computer 1. When such processing is repeated for each card 5, and a predetermined number of cards 5 are issued, the card issue processing is completed.

When, for example, the conventional card encoder as a task processing apparatus is to issue the card 5, the main CPU 2 transmits information to the sub-CPUs 41A, 42A, 42B, and 43A for respectively executing different tasks, e.g., recording of value information and card selection processing with respect to the card 5, via the communication CPU 3, thereby directly controlling the sub-CPUs. For this reason, the load on the main CPU 2 increases to cause a delay in the processing performed by the main CPU 2. In addition, since the communication CPU 3 is required to transmit information between the main CPU 2 and the sub-CPUs 41A, 42A, 42B, and 43A, the apparatus cannot be economically designed.

SUMMARY OF THE INVENTION

It is an object of the present invention to provide a task processing apparatus which reduces the load on a main CPU.

It is another object of the present invention to provide a task processing apparatus which can achieve a reduction in cost by eliminating the necessity of a communication CPU between a main CPU and sub-CPUs.

In order to achieve the above objects, according to the present invention, there is provided a task processing apparatus comprising a main CPU, a plurality of sub-CPUs for independently executing a series of difference tasks set in advance in accordance with a predetermined sequence, first starting means, arranged in the main CPU, for outputting a first starting signal for starting a first sub-CPU, of the plurality of sub-CPUs, which executes a first task at the start of the series of tasks, second starting means, arranged in each of the sub-CPUs except for a last sub-CPU, for, when a task in a given sub-CPU is completed, outputting a second starting signal for starting a next sub-CPU which executes a next task, and notification means, arranged in the last sub-CPU of the plurality of sub-CPUs, for supplying a processing completion signal indicating completion of the series of tasks to the main CPU when the last task is completed.

BRIEF DESCRIPTION OF THE DRAWINGS

FIG. 3 is a view showing the data format of data transmitted between sub-CPUs in FIG. 1; and FIG. 4 is a block diagram showing a card encoder as a conventional task processing apparatus.

DESCRIPTION OF THE PREFERRED EMBODIMENT

The present invention will be described below with reference to the accompanying drawings.

Figure 1:
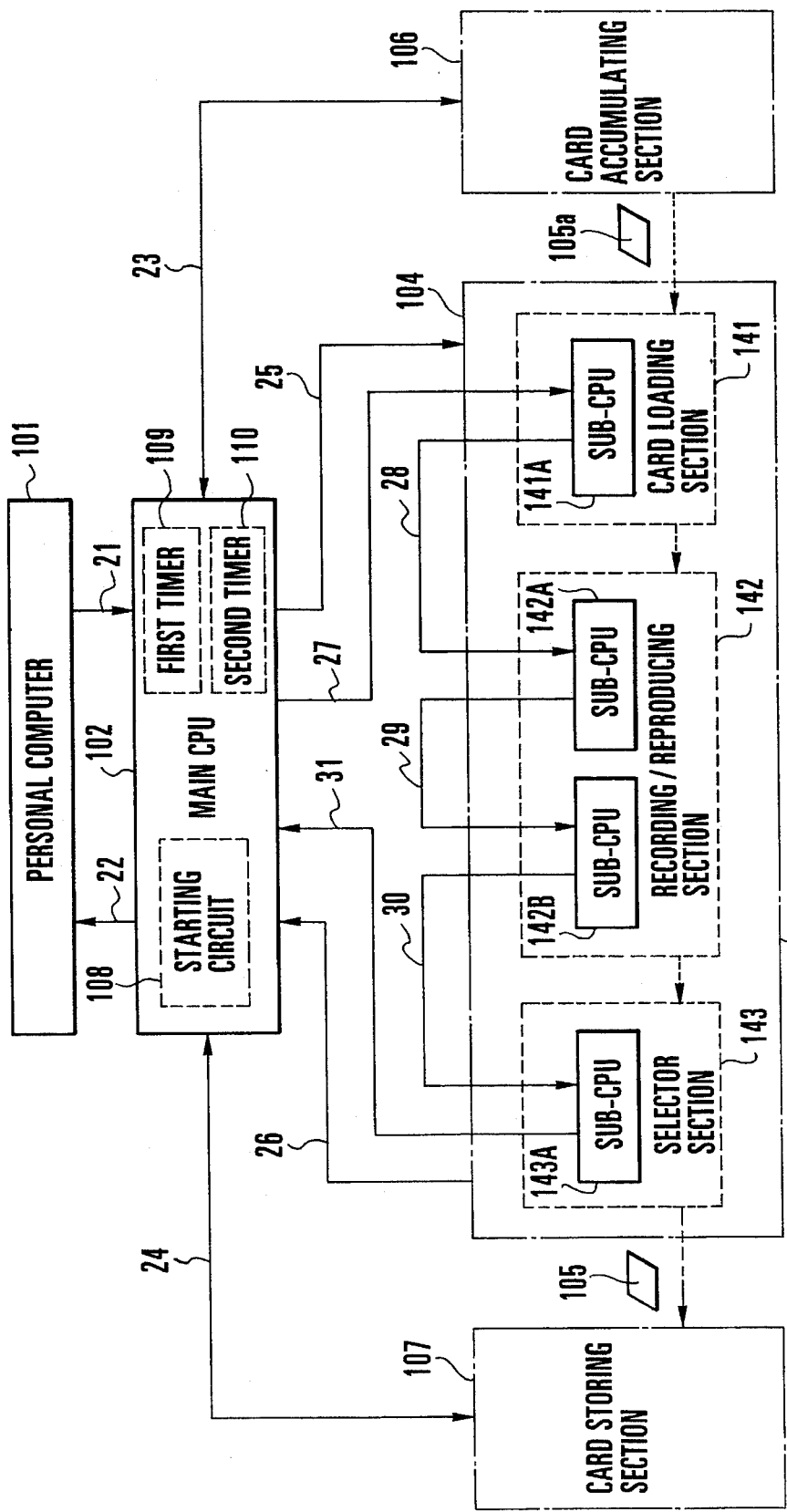
FIG. 1 is a block diagram showing an embodiment of a card encoder as a task processing apparatus of the present invention.

FIG. 1 shows an embodiment of a card encoder as a task processing apparatus according to the present invention, and more specifically the main part of the card encoder for magnetically recording value information equivalent to a prepaid amount on a magnetic card, and issuing the card. As shown in FIG. 1, the encoder comprises a personal computer 101 for designating card issue operation, a main CPU 102 including a starting circuit 108 and first and second timers 109 and 110 and designed to control card issue processing, a card loading section 141 including sub-CPUs 141A, 142A, 142B, and 143A, a card convey system 104 constituted by a recording/reproducing section 142 and a selector section 143, a card accumulating section 106 for accumulating a large number of non-recorded cards 105a, on which no value information is recorded, and feeding the non-recorded cards 105a one by one to the card convey system 104, and a card storing section 107 for storing recorded cards 105 having value information recorded thereon and fed from the card convey system 104. The communication CPU 3 in the conventional apparatus shown in FIG. 4 is omitted from the apparatus of the present invention.

Referring to FIG. 1, reference numerals 23 and 24 denote signals transmitted between the main CPU 102, the card accumulating section 106, and the card storing section 107; 25, drive signals for driving the respective motors (to be described later) in the card convey system 104; 26, signals from sensors (to be described later) arranged at the respective portions in the card convey system 104 to detect the presence/absence of the cards 105 and 105a; 27, a control signal indicating the start of card issue processing and transmitted from the starting circuit 108 of the main CPU 102 to the sub-CPU 141A of the card loading section 141 in accordance with a card issue command signal 21 from the personal computer 1; 28, a signal output from the sub-CPU 141A of the card loading section 141 to the sub-CPU 142A of the recording/reproducing section 142 after the sub-CPU 141A detects information provided for the non-recorded card 105a in accordance with the control signal 27; 29, a signal output from the sub-CPU 142A of the recording/reproducing section 142 to the sub-CPU 142B of the recording/reproducing section 142 after the sub-CPU 142A executes information recording processing with respect to the non-recorded card 105a in accordance with the signal 28; 30, a signal output from the sub-CPU 142B of the recording/reproducing section 142 to the sub-CPU 143A of the selector section 143 after the sub-CPU 142B performs predetermined reproduction processing in accordance with the signal 29; and 31, a signal output, as a selection result, from the sub-CPU 143A of the selector section 143 to the main CPU 102. This selection result is obtained when the sub-CPU 143A performs selection processing with respect to the card 105 in response to the signal 30.

Note that each of the signals 28, 29, and 30 transmitted between the sub-CPUs 141A, 142A, 142B, and 143A and the signal 31 transmitted from the sub-CPU 143A to the main CPU 102 has a data format like the one shown in FIG. 3. According to this data format, in issuing the card 105, a code corresponding to defect/non-defect information of the card is stored in a code storage area 51, and the numbers "1", "2", "3", and "4" corresponding to the sub-CPUs 141A, 142A, 142B, and 143A in which errors occur are respectively stored in CPU number storage areas 52, 53, 54, and 55. Assume that a reproduction error occurs when the sub-CPU 142B reproduces the information recorded on the card 105. In this case, a corresponding error code is stored in the code storage area 51, and the number "3" indicating the sub-CPU 142B is stored in the third CPU number storage area 54.

Figure 2:
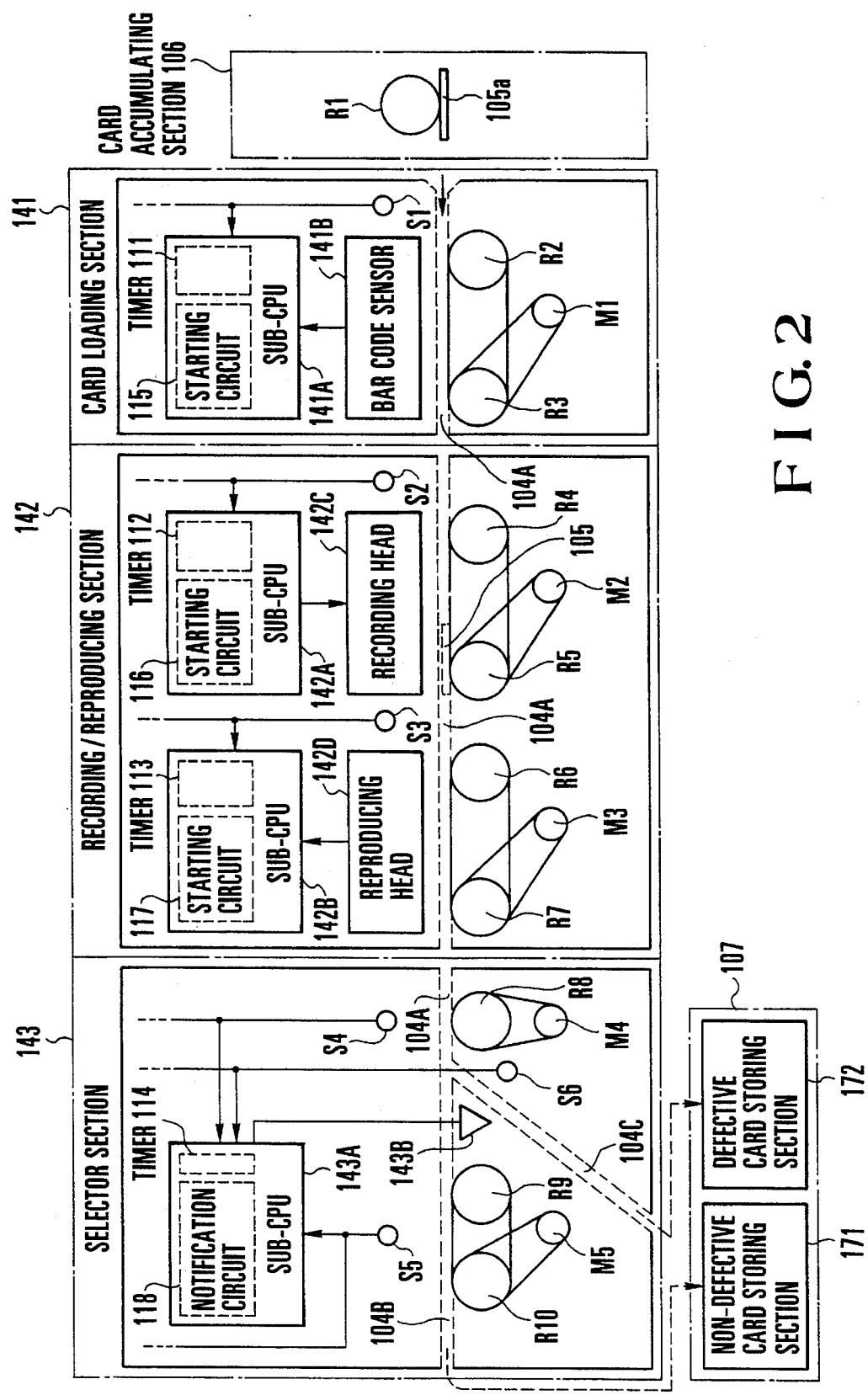
FIG. 2 is a schematic sectional view of a card convey system in FIG. 1.

FIG. 2 schematically shows the cross-section of the card convey system 104 of the card encoder in FIG. 1.

Referring to FIG. 2, reference numerals 104A to 104C denote card convey paths; 141B, a bar code detecting sensor for reading a bar code attached to the non-recorded card 105a; 142C, a recording head for recording value information on the non-recorded card 105a; 142D, a reproducing head for reproducing recorded value information; 143B, a selector lever to be driven by a solenoid (not shown) to switch the card convey paths 104B and 104C; a 171, a non-defective card storing section arranged in the card storing section 107; and 172, a defective card storing section arranged in the card storing section 107. Reference symbols R1 to R5 denote rollers for loading and conveying the cards 105a and 105; M1 to M5, motors driven by the main CPU 2 to rotate the rollers R1 to R10; and S1 to S6, sensors for detecting the presence/absence of the cards 105a and 105. Detection outputs from the sensors S1 to S6 are output to the sub-CPUs 141A, 142A, 142B, and 143A and the main CPU 102. The sub-CPUs 141A, 142A, 142B, and 143A have timers 111 to 114 for respectively detecting abnormalities in the main CPU 102 and the preceding sub-CPUs 141A, 142A, and 142B. Note that the timer 111 of the sub-CPU 141A may be omitted. The sub-CPUs 141A, 142A, and 142B also have starting circuits 115, 116, and 117 for respectively starting task processing for card issue operations of the next sub-CPUs 142A, 142B, and 143A. The sub-CPU 143A has a notification circuit 118 for outputting a processing completion notification signal indicating the completion of card issue processing to the main CPU 102.

The card loading section 141 has the card convey path 104A and comprises the sub-CPU 141A having the timer 111 and the starting circuit 115, the bar code detecting sensor 141B, the sensor S1, the motor M1, and the rollers R2 and R3. The recording/reproducing section 142 has the card convey path 104A and comprises the sub-CPU 142A having the timer 112 and the starting circuit 116, the sub-CPU 142B having the timer 113 and the starting circuit 117, the recording head 142C, the reproducing head 142D, the sensors S2 and S3, the motors M2 and M3, and the rollers R4 to R7. The selector section 143 has card convey paths 104A, 104B, and 104C and comprises the sub-CPU 143A having the timer 114 and the notification circuit 118, the selector lever 143B, the sensors S4 to S6, the motors M4 and M5, and the rollers R8 to R10.

The operation of the card convey system 104 in card issue processing will be described briefly first. One of the non-recorded cards 105a accumulated in the card accumulating section 106 is fed to the card loading section 141 by rotating the roller R1. Upon reception of the non-recorded card 105a, the card loading section 141 detects a common bar code attached to the card 105a in advance and indicating the issuer and the like to determined whether recording on the card 105a is allowed. If it is determined that recording on the card 105a is allowed, predetermined value information is recorded/reproduced on/from the card 105a by the recording/reproducing section 142. The selector section 143 checks in accordance with the reproduced information from the card 105 whether the card 105 is defective/non-defective. If it is determined that the card 105 is non-defective, the card 105 is stored in the non-defective card storing section 171, thus issuing the card 105. If it is determined that the card 105 is defective, the card 105 is stored in the defective card storing section 172. Note that the time required to issue one card 105 is 500 msec, so that the issue cycle of the cards 105 is specified by using the first timer 109 of the main CPU 102.

The operation of the card encoder will be described in detail next with reference to FIGS. 1 and 2.

When a predetermined number of non-recorded cards 105a are accumulated in the card accumulating section 106, and an operator performs a card issue operation by using the personal computer 101, the card issue command signal 21 is sent to the main CPU 102. Since the time required to issue one card is 500 msec, the main CPU 102 supplies the signal 23 to the card accumulating section 106 every 500 msec in accordance with a periodic output from the first timer 109, thereby feeding the cards 105a one by one. That is, the card 105a is fed to the card loading section 141 every 500 msec by driving the roller R1 in the card accumulating section 106.

When the non-recorded card 105a is fed to the card loading section 141, the main CPU 102 detects the card through the sensor S1 in the card loading section 141. When the card 105a is detected, the starting circuit of the main CPU 102 outputs the control signal 27 representing a card issue command to the sub-CPU 141A. Note that this control signal 27 is also output every 500 msec, similar to the control signal 23 for controlling a loading operation with respect to the card 105a. The main CPU 102 also supplies the drive signals 25 to the motors M1 to M4 to convey the cards 105a and 105 along the convey path 104A at a predetermined speed. With this operation, the rollers R2 to R8 coupled to the motors M1 to M4 are rotated at the predetermined speed, and the main CPU 102 detects and checks the passage of the cards 105a and 105 at the respective points in the card convey path 104A through the sensors S2 to S4.

Upon reception of the control signal 27 representing the card issue command, the sub-CPU 141A of the card loading section 141 starts task processing for the issue of a card. More specifically, when the presence of the non-recorded card 105a is determined by the sensor S1, a command bar code attached to the card 105a in advance is detected by the bar code detecting sensor 141B. The starting circuit 115 of the sub-CPU 141A generates a code corresponding to the detection result, indicating defect/non-defect information, in accordance with the format shown in FIG. 3, and transmits the code, as the signal 28, to the sub-CPU 142A of the recording/reproducing section 142. In this case, the code corresponding to a defective/non-defective card is stored in the code storage area 51, and the number "1" corresponding to the sub-CPU 141A is stored in the CPU number storage area 52 if the card is defective. The resultant data is then output as the signal 28. The signal 28 with the code corresponding to a non-defective card and stored in the code storage area is output, as a starting signal, to the sub-CPU 142A.

Upon reception of this signal 28, the sub-CPU 142A of the recording/reproducing section 142 checks from the contents of the code storage area 51 of the signal 28 whether value information can be recorded on the conveyed non-recorded card 105a. If the card 105a is non-defective, task processing for the issue of the card is started. More specifically, upon confirming the arrival of the card 105a through the sensor S2, the sub-CPU 142A drives the recording head 142C to record predetermined value information on this non-defective card. When recording on the card 105 is completed, the starting circuit 116 supplies the received signal 28, as the signal 29, to the sub-CPU 142B without changing the contents of the signal 28, thereby notifying that recording on the card 105 is completed. In contrast to this, if the conveyed card 105a is a defective card, the starting circuit 116 of the sub-CPU 142A supplies the signal 28 with an error code attached thereto, as the signal 29, to the sub-CPU 142B without recording any information on the card 105.

The sub-CPU 142B of the recording/reproducing section 142 serves to reproduce the information recorded on the conveyed card 105. In this case, the sub-CPU 142B checks in accordance with the received signal 29 whether the recorded information can be reproduced. More specifically, if the card 105 subjected to reproduction processing is a defective card, the starting circuit 117 transmits the signal with an error code attached thereto, as the signal 30, to the sub-CPU 143A of the selector section 143. If the card 105 subjected to reproduction processing is a non-defective card, task processing for the issue of the card is started. More specifically, upon confirming the arrival of the card 105 through the sensor S3, the sub-CPU 142B drives the reproducing head 142D to reproduce the information recorded on the card 105. The sub-CPU 142B then checks the reproduced information, and the starting circuit 117 generates a code corresponding to a check result, indicating whether the information is proper, in accordance with the format shown in FIG. 3, and sends it, as the signal 30, to the sub-CPU 143A of the selector section 143.

Upon reception of this signal 30, the sub-CPU 143A checks, on the basis of the contents of the received signal 30, whether the received card 105 is defective/non-defective. If it is determined that the card is non-defective, task processing for the issue of the card is started. More specifically, upon confirming the arrival of the card 105, the sub-CPU 143A drives a solenoid (not shown) to switch the selector lever 143B so as to convey the non-defective card through the convey path 104B, thus storing the card in the non-defective card storing section 171. In contrast to this, if it is determined that the card is defective, the sub-CPU 143A conveys the defective card through the convey path 104C to store the card in the defective card storing section 172. The notification circuit 118 supplies the signal 30 received as a card selection result, as the signal 26 indicating the completion of the card issue processing, to the main CPU 102 without changing the contents of the signal 30. As a result, in the main CPU 102, the issue of one card is counted depending on whether the card is defective/non-defective.

In this manner, the sub-CPUs 141A, 142A, 142B, and 143A for respectively executing different tasks constituting card issue processing are sequentially started every 500 msec in response to the transmitted signals 28, 29, and 30. With this operation, cards are issued one by one. If an abnormality occurs in any one of the sub-CPUs 141A, 142A, 142B, and 143A during card issue processing, the following processing is performed by using the timers 111 to 114.

In a normal operation, if there is no abnormality in the sub-CPU 142A, the sub-CPU 142B receives the signal 29 from the sub-CPU 142A every about 500 msec. If, however, an abnormality occurs in the sub-CPU 142A, the sub-CPU 142B can receive no signal from the sub-CPU 142A. For such a case, the sub-CPU 142B causes the timer 113 to measure a predetermined time (e.g., 500 msec+$\alpha$) which starts to elapse when the signal 29 in the previous card issue processing is properly received. If the signal 29 from the sub-CPU 142A is not received within this predetermined period of time, a time-out output from the timer 113 is sent. Upon detection of the time-out output from the timer 113, the sub-CPU 142B generate data in which a code indicating the abnormal state of the sub-CPU 142A is stored in the code storage area 51 shown in FIG. 3, and the number "2" corresponding to the sub-CPU 142A is stored in the CPU number storage area 52. The sub-CPU 142B transmits the data, as the signal 30, to the next sub-CPU 143A. The sub-CPU 143A transmits the signal 30, as the signal 31, to the main CPU 102 without changing the contents of the signal 30. With this operation, the main CPU 102 recognizes the failure in the sub-CPU 142A. As a result, information indicating the abnormality in the sub-CPU 142A is displayed on the personal computer 101.

In addition, when the last sub-CPU 143A of the selector section 143, or a plurality of sub-CPUs including the sub-CPU 143A have failed, the main CPU 102 performs the following abnormality determination processing by using the second timer 110.

When the main CPU 102 receives the signal 31 from the last sub-CPU 143A about 500 msec after the control signal 27 is supplied to the first sub-CPU 141A, the main CPU 102 determines that the sub-CPUs 141A, 142A, 142B, and 143A operate normally. The main CPU 102 starts the second timer having a predetermined period of time (e.g., 500 msec+$\alpha$) at the time of transmission of the control signal 27. If the signal 31 from the sub-CPU 143A cannot be received after the lapse of the predetermined period of time, the main CPU 102 determines that the last sub-CPU 143A or a plurality of sub-CPUs including the sub-CPU 143A are in an abnormal state, thus causing the personal computer 101 to notify and display this abnormal state.

As has been described above, according to the present invention, when a plurality of tasks for, e.g., issuing a card are to be assigned to a plurality of sub-CPUs to be executed, the main CPU starts the first sub-CPU to execute the first task, and starts the next sub-CPU upon completion of the first task. When the last sub-CPU is started, and the last task is completed, information indicating the completion of the task is notified to the main CPU. With this operation, the CPU need not control the respective sub-CPUs by directly transmitting information thereto every time task processing is to be started. Therefore, the load on the main CPU can be reduced. In addition, there is no need to use a communication CPU for transmitting information between the main CPU and the sub-CPUs.

Furthermore, since abnormalities in the respective sub-CPUs can be separately detected, a sub-CPU in an abnormal state can be easily specified.

What is claimed is:

1. A task processing apparatus comprising:

a main CPU for managing a series of different tasks processing, the main CPU having first timer means for setting a processing interval of the series of tasks;

a plurality of sub-CPUs for independently executing a series of different tasks set in advance in accordance with a predetermined sequence;

first starting means, arranged in said main CPU, for outputting a first starting signal for starting a first sub-CPU, of said plurality of sub-CPUs, which executes a first task at the start of the series of tasks;

second starting means, arranged in each of said sub-CPUs except for a last sub-CPU, for, when a task in a given sub-CPU is completed, outputting a second starting signal for starting a next sub-CPU which executes a next task, each of said sub-CPUs including second timer means which has a timer time slightly longer than that of said first timer and is started in response to the second starting signal, said first starting means of said main CPU periodically outputting the first starting signals to said first sub-CPU on the basis of timer time outputs from said first timer means, and each of said sub-CPUs detecting an abnormality in a preceding sub-CPU when the second starting signal from said preceding sub-CPU does not arrive within the timer time of said second timer means; and notification means, arranged in said last sub-CPU of said plurality of sub-CPUs, for supplying a processing completion signal indicating completion of the series of tasks to the main CPU when the last task is completed.

2. An apparatus according to claim 1, wherein upon detection of an abnormality in a preceding sub-CPU of said plurality of sub-CPUs, each sub-CPU outputs abnormality information indicating the abnormality to said next sub-CPU together with identification information of said next sub-CPU, in which the abnormality is detected, instead of the second starting signal, and upon reception of abnormality information and identification information from said preceding sub-CPU, said each sub-CPU notifies the abnormality information and the identification information to said next sub-CPU without any modification.

3. An apparatus according to claim 1, wherein upon detection of an abnormality in a preceding sub-CPU, said last sub-CPU outputs abnormality information indicating the abnormality to said main CPU together with identification information of said preceding sub-CPU, in which the abnormality is detected, instead of a processing completion signal.

4. An apparatus according to claim 1, wherein said main CPU comprises third timer means which has a timer time slightly longer than that of said first timer means and is started when a starting signal is output to said first sub-CPU, and detects at least an abnormality in said last sub-CPU when a processing completion signal from said notification means of said last sub-CPU does not arrive within the timer time of said third timer means.

5. A task processing apparatus for issuing a card, comprising:

a main CPU for managing a series of different tasks processing, including card issue processing, the main CPU having first timer means for setting a processing interval of the series of tasks;

a plurality of sub-CPUs for independently executing a series of tasks for a card loading operation, an information recording operation, an information reproducing operation, a checking operation, and a card selecting operation constituting the card issue processing in accordance with a predetermined sequence;

first starting means, arranged in said main CPU, for outputting a first starting signal for starting a first sub-CPU, of said plurality of sub-CPUs, which executes the task for the card loading operation, at the start of the series of tasks;

second starting means, arranged in each of said sub-CPUs, except for a last sub-CPU, for, when a task in a given sub-CPU is completed, outputting a second starting signal for starting a next sub-CPU which executes a next task, each of said sub-CPUs including second timer means which has a timer time slightly longer than that of said first timer and is started in response to the second starting signal, said first starting means of said main CPU periodically outputs the first starting signals to said first sub-CPU on the basis of timer time outputs from said first timer means, and each of said Sub-CPUs detects an abnormality in a preceding sub-CPU when the second starting signal from said preceding sub-CPU does not arrive within the timer time of said second timer means; and notification means, arranged in said last sub-CPU for executing the task for the card selecting operation, for supplying a processing completion signal indicating completion of the card issue processing to said main CPU when the task for the card selecting operation is completed.

6. An apparatus according to claim 5, further comprising a card accumulating section in which non-recorded cards are accumulated and from which non-recorded cards are fed one by one at predetermined time intervals in accordance with a control signal from said main CPU;

a card loading section for causing said sub-CPU for executing the task for the card loading operation to load the non-recorded cards fed from said card accumulating section one by one, a recording section for causing said sub-CPU for executing the task for the information recording operation to record information on each non-recorded card loaded by said card loading section, a reproducing section for causing said sub-CPU for executing the task for the information reproducing and checking operations to reproduce and check the recorded information from the recorded card supplied from said recording section, a selector section for causing said sub-CPU for executing the task for the card selecting operation to sort recorded cards into non-defective and defective cards on the basis of check results obtained by said reproducing section, and a card storing section for separately storing the non-defective and defective cards selected by said selector section.

7. A task processing apparatus comprising:

a main CPU for managing a series of different tasks including card issue processing, the main CPU having first timer means for setting a processing interval of the series of tasks;

a plurality of sub-CPUs for independently executing a series of different tasks set in advance in accordance with a predetermined sequence, said series of different tasks including the card issue processing;

first starting means, arranged in said main CPU, for outputting a first starting signal for starting a first sub-CPU, of said plurality of sub-CPUs, which executes a first task at the start of the series of tasks;

second starting means, arranged in each of said sub-CPUs except for a last sub-CPU, for, when a task in a given sub-CPU is completed, outputting a second starting signal for starting a next sub-CPU which executes a next task, each of said sub-CPUs comprises second timer means which has a timer time slightly longer than that of said first timer and is started in response to the second starting signal, said first starting means of said main CPU for periodically outputting the first starting signals to said first sub-CPU on the basis of timer time outputs from said first timer means, and each of said sub-CPUs detecting an abnormality in a preceding sub-CPU when the second starting signal from said preceding sub-CPU does not arrive within the timer time of said second timer means; and notification means, arranged in said last sub-CPU of said plurality of sub-CPUs, for supplying a processing completion signal indicating completion of the series of tasks to the main CPU when the last task is completed, said processing completion signal including a card issue completion signal.

* * * * *